United States Patent
Bhuvaneswaran

(10) Patent No.: US 10,216,727 B2
(45) Date of Patent: *Feb. 26, 2019

(54) VISUALLY DIFFERENTIATING STRINGS FOR TESTING

(71) Applicant: Microsoft Technology Licensing, LLC, Redmond, WA (US)

(72) Inventor: Shiva Kavindpadi Bhuvaneswaran, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/426,771

(22) Filed: Feb. 7, 2017

(65) Prior Publication Data

US 2017/0147562 A1 May 25, 2017

Related U.S. Application Data

(63) Continuation of application No. 14/503,373, filed on Sep. 30, 2014, now Pat. No. 9,594,749.

(51) Int. Cl.
*G06F 17/28* (2006.01)
*G06F 9/451* (2018.01)

(52) U.S. Cl.
CPC .......... *G06F 17/2836* (2013.01); *G06F 9/454* (2018.02); *G06F 17/289* (2013.01); *G06F 17/2854* (2013.01)

(58) Field of Classification Search
CPC ............. G06F 17/2836; G06F 17/2854; G06F 17/289; G06F 9/4448
See application file for complete search history.

(56) References Cited

U.S. PATENT DOCUMENTS

| | | | |
|---|---|---|---|
| 7,797,349 B2 | 9/2010 | Kosaka | |
| 8,037,199 B2 | 10/2011 | MacKay et al. | |
| 8,612,893 B2 | 12/2013 | Fitzpatrick et al. | |
| 9,594,749 B2 | 3/2017 | Bhuvaneswaran | |
| 2003/0115552 A1* | 6/2003 | Jahnke | G06F 9/4448 715/201 |
| 2009/0282394 A1 | 11/2009 | Raj | |
| 2009/0307365 A1* | 12/2009 | MacKay | G06F 8/60 709/230 |
| 2010/0023319 A1* | 1/2010 | Bikel | G06F 17/27 704/9 |

(Continued)

FOREIGN PATENT DOCUMENTS

EP 1202168 5/2002

OTHER PUBLICATIONS

"Localization Checklist", Published on: Jul. 6, 2014, 8 pages, available at: https://developer.android.com/distribute/tools/localization-checklist.html#manage-strings.

(Continued)

*Primary Examiner* — Qian Yang

(57) ABSTRACT

In one embodiment, a data string test system may use a color-coding system, or other visual marker, to indicate which data strings are ready for testing. The data string test system may calculate a localization test status of a data string. The data string test system may apply a visual marker of the localization test status of the data string to the data string. The data string test system may present the visual marker and the data string to a user.

20 Claims, 10 Drawing Sheets

(56) References Cited

U.S. PATENT DOCUMENTS

| | | |
|---|---|---|
| 2010/0262660 A1 | 10/2010 | Little |
| 2013/0223680 A1 | 8/2013 | Sugasawa |
| 2013/0326323 A1 | 12/2013 | Siwoff |
| 2014/0114642 A1* | 4/2014 | van den Oever ... G06F 17/2818 704/2 |
| 2014/0172411 A1* | 6/2014 | Kim ................... G06F 17/2854 704/2 |
| 2015/0242512 A1* | 8/2015 | Lindahl ............ G06F 17/30867 707/723 |

OTHER PUBLICATIONS

"Localization", Published on: Oct. 23, 2013, 13 pages, available at: http://kitsune.readthedocs.org/en/latest/localization.html#testing-localized-strings.

"Localization", Retrieved on: Aug. 4, 2014, 6 pages, available at: http://developer.blackberry.com/native/documentation/cascades/device_platform/internationalization/localization.html.

"Testing Your Internationalized App", Published on: Jun. 3, 2014, 4 pages, available at: https://developer.apple.com/library/prerelease/ios/documentation/MacOSX/Conceptual/BPInternational/TestingYourInternationalApp/TestingYourInternationalApp.html.

"Visual Localizer", Published on: Nov. 1, 2013, 6 pages, available at: http://visuallocalizer.codeplex.com/documentation.

PCT International 2nd Written Opinion in PCT/2015/052759, dated Aug. 18, 2016, 6 pages.

PCT International Search Report and Written Opinion Issued in PCT/US2015/052759, dated Feb. 9, 2016, 11 pages.

Reynaud, Claire, "Getting your iPhone App Ready for Localization", Published on: Nov. 21, 2013, 11 pages, available at: https://www.clairereynaud.net/blog/getting-your-iphone-app-ready-for-localization/.

Safar, et al., "Best Practices in Localization Testing", In Journal of Multilingual, vol. 21, Issue 1, Jan. 2010, 5 pages.

U.S. Appl. No. 14/503,373, Office Action dated Nov. 19, 2015, 19 pages.

U.S. Appl. No. 14/503,373, Office Action dated Mar. 17, 2016, 22 pages.

U.S. Appl. No. 14/503,373, Office Action dated Jul. 6, 2016, 16 pages.

U.S. Appl. No. 14/503,373, Amendment and Response filed Feb. 19, 2016, 13 pages.

U.S. Appl. No. 14/503,373, Amendment and Response filed Jun. 17, 2016, 19 pages.

U.S. Appl. No. 14/503,373, Amendment and Response filed Oct. 6, 2016, 16 pages.

U.S. Appl. No. 14/503,373, Notice of Allowance dated Oct. 31, 2016, 17 pages.

PCT International Preliminary Report on Patentability Issued in PCT/US2015/052759, dated Jan. 2, 2017, 7 pages.

* cited by examiner

| HASH ID 410 | STRING 420 | TRANSLATED VERSION 430 | LANGUAGE ID 440 | CONFIDENCE SCORE 450 | LOCALIZATION FLAG 460 | HISTORY 470 |

400
Figure 4

VISUALLY DIFFERENTIATING STRINGS FOR TESTING

CROSS-REFERENCE TO RELATED APPLICATIONS

This application is a continuation application of U.S. patent application Ser. No. 14/503,373, (now U.S. Pat. No. 9,594,749), entitled "VISUALLY DIFFERENTIATING STRINGS FOR TESTING," filed on Sep. 30, 2014, the entire disclosure of which is hereby incorporated herein by reference.

BACKGROUND

A data string is a set of characters. A computing device may implement a software application based upon the data string. Alternately, the computing device may present the data string to a user. A data string may be translated from an original language to a localization language. A localization language is the language native to the location containing the computing device. For example, a coder may compose a data string written in English. A computing device located in Japan may store the data string. The coder may localize the string to Japanese for easier consumption by a user.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to using a color-coding system, or other visual marker, to indicate which data strings are ready for testing. The data string test system may calculate a localization test status of a data string. The data string test system may apply a visual marker of the localization test status of the data string to the data string. The data string test system may present the visual marker and the data string to a user.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 4 illustrates, in a block diagram, one embodiment of a data string record.

DETAILED DESCRIPTION

Figure 1:
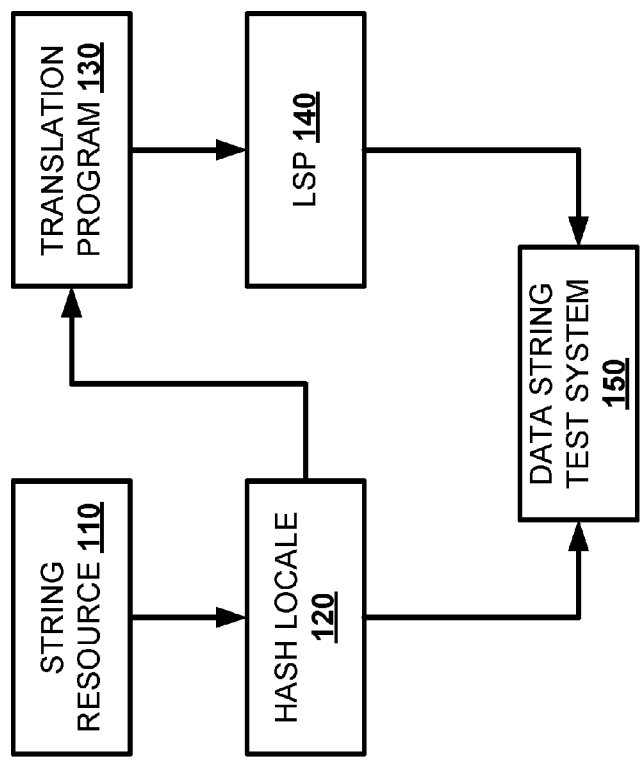
FIG. 1 illustrates, in a block diagram, one embodiment of a string management system.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a data string test system.

A data string test system may generate a hash value for a data string of a software application to identify the data string. The data string test system may append the hash value to the value of the string. The hash value may be six hexadecimal digits suffixed by an underscore. A hash locale may contain the data string prefixed by the hash value. When the software application is rendered in the hash locale, the data string and hash identifier may be visibly displayed. The hash value may identify a resource path, a resource identifier, and a resource value for the hash.

By generating the latest hash value and comparing that hash value with the previous hash value, the data string test system may identify a data string that has been changed. By recording each entry in for the current hash values not among the previous hash values, the data string test system may compile a list of hash values for data strings that were modified or added to the product, determining a change status for the data string.

The data string test system may compile a list of data strings that have not been translated to a local language, or "localized". The data string test system may compare a current list of untranslated data strings to a previous list of untranslated data strings to identify data strings that were translated in the recent product build, determining a localization status for the data string.

The data string test system may use the change status and the localization status to determine a localization test status, indicating whether a data string is ready to be localization tested. Localization testing checks the quality of the localization of a data string for a particular target locale or culture. The data string test system may apply a visual marker to a data string when presenting that data string to the user to indicate the localization test status. A visual marker is overlaid atop the data string, rather than inherently changing the data string. A user may use the visual marker to identify quickly a data string for testing.

Thus, in one embodiment, a data string test system may use a color-coding system, or other visual marker, to indicate which data strings are ready for testing. The data string test system may calculate a localization test status of a data string. The data string test system may apply a visual marker of the localization test status of the data string to the data string. The data string test system may present the visual marker and the data string to a user.

FIG. 1 illustrates, in a block diagram, one embodiment of a data string management system 100. A string resource 110 may be a data file used to generate a data string as part of a software application. The data string management system 100 may store a data string generated from the string resource 110 in a hash locale 120.

The data string management system 100 may provide the data string to a translator for translation to a local language, referred to as "localization". The translator may be a translation program 130 or a human translator. A translation program may translate the data string using auto-translation or machine translation. Auto-translation uses previously existing translations to translate the data string. Machine translation translates the data string on a word-by-word basis. The translation program 130 may provide a translation of the data string as well as a confidence score, indicating the probability that the translation is accurate. The translation program 130 may send the translation of the data string to a localization service provider (LSP) 140 for review and possible revision. A localization service provider 140 translates the data string into a local language. The translation program 130 may send each translated data string to the localization service provider 140 or just the translated data strings with a confidence score below an automatic review threshold. Once the data string has been approved by the localization service provider 140, the localization service provider 140 may set a localization flag on the data string indicating that the data string has been localized. Alternately, the translation program 130 may set the localization flag if the confidence score is above a specific confidence threshold. The localization service provider 140 may send the data string to a data string test system 150 for testing. The confidence threshold may be pre-set, or set by the localization service provider 140 or the data string test system 150. The data string test system 150 may identify a data string for various types of testing.

Figure 2:
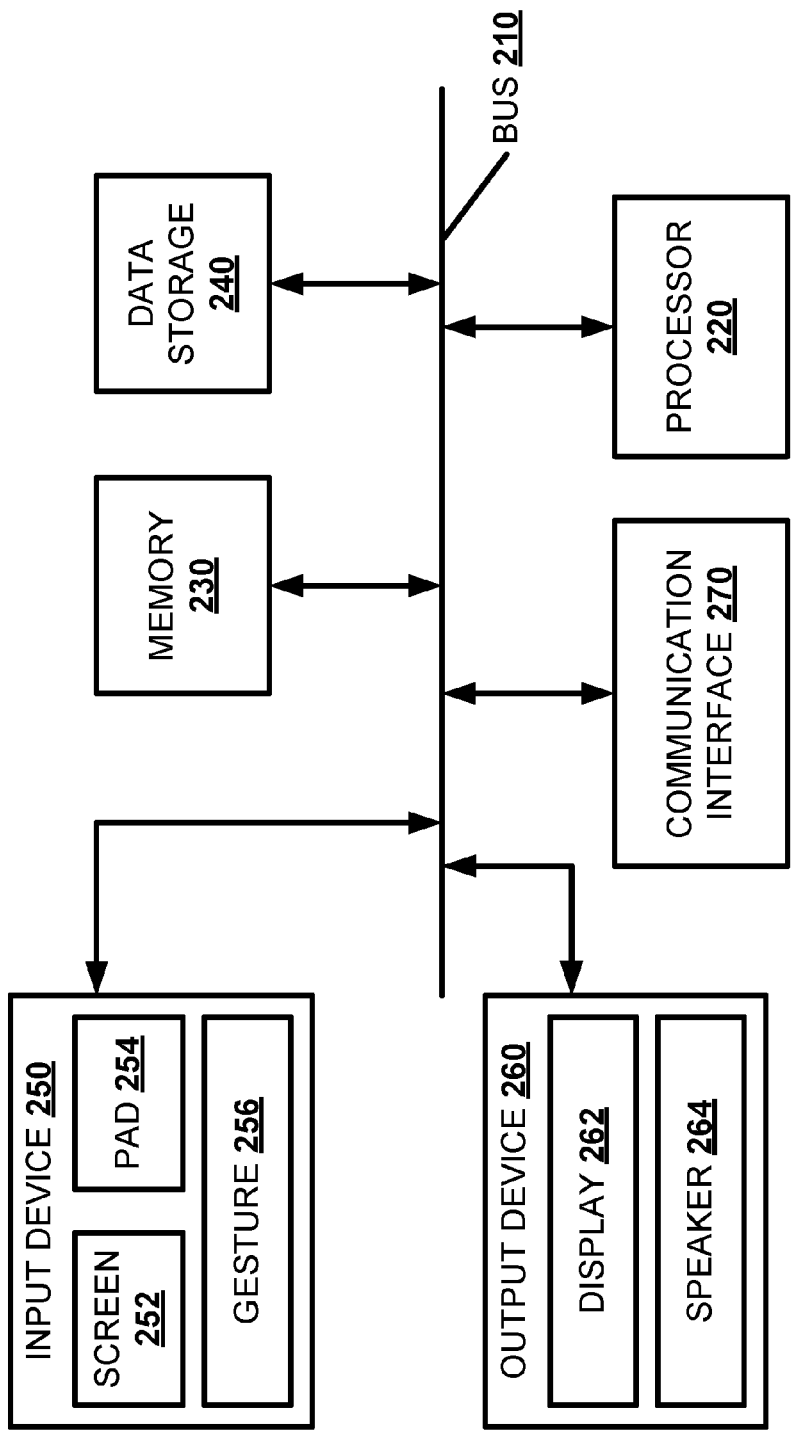
FIG. 2 illustrates, in a block diagram, one embodiment of a computing device.

FIG. 2 illustrates a block diagram of an exemplary computing device 200 which may act as a data string test system 150. The computing device 200 may combine one or more of hardware, software, firmware, and system-on-a-chip technology to implement a data string test system 150. The computing device 200 may include a bus 210, a processor 220, a memory 230, a data storage 240, an input device 250, an output device 260, and a communication interface 270. The bus 210, or other component interconnection, may permit communication among the components of the computing device 200.

The processor 220 may include at least one conventional processor or microprocessor that interprets and executes a set of instructions. The memory 230 may be a random access memory (RAM) or another type of dynamic data storage that stores information and instructions for execution by the processor 220. The memory 230 may also store temporary variables or other intermediate information used during execution of instructions by the processor 220. The data storage 240 may include a conventional ROM device or another type of static data storage that stores static information and instructions for the processor 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing a data string and associated metadata.

The input device 250 may include one or more conventional mechanisms that permit a user to input information to the computing device 200, such as a keyboard, a mouse, a voice recognition device, a microphone, a headset, a touch screen 252, a touch pad 254, a gesture recognition device 256, etc. The output device 260 may include one or more conventional mechanisms that output information to the user, including a display screen 262, a printer, one or more speakers 264, a headset, or a medium, such as a memory, or a magnetic or optical disk and a corresponding disk drive. The communication interface 270 may include any transceiver-like mechanism that enables computing device 200 to communicate with other devices or networks. The communication interface 270 may include a network interface or a transceiver interface. The communication interface 270 may be a wireless, wired, or optical interface.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

Figure 3:
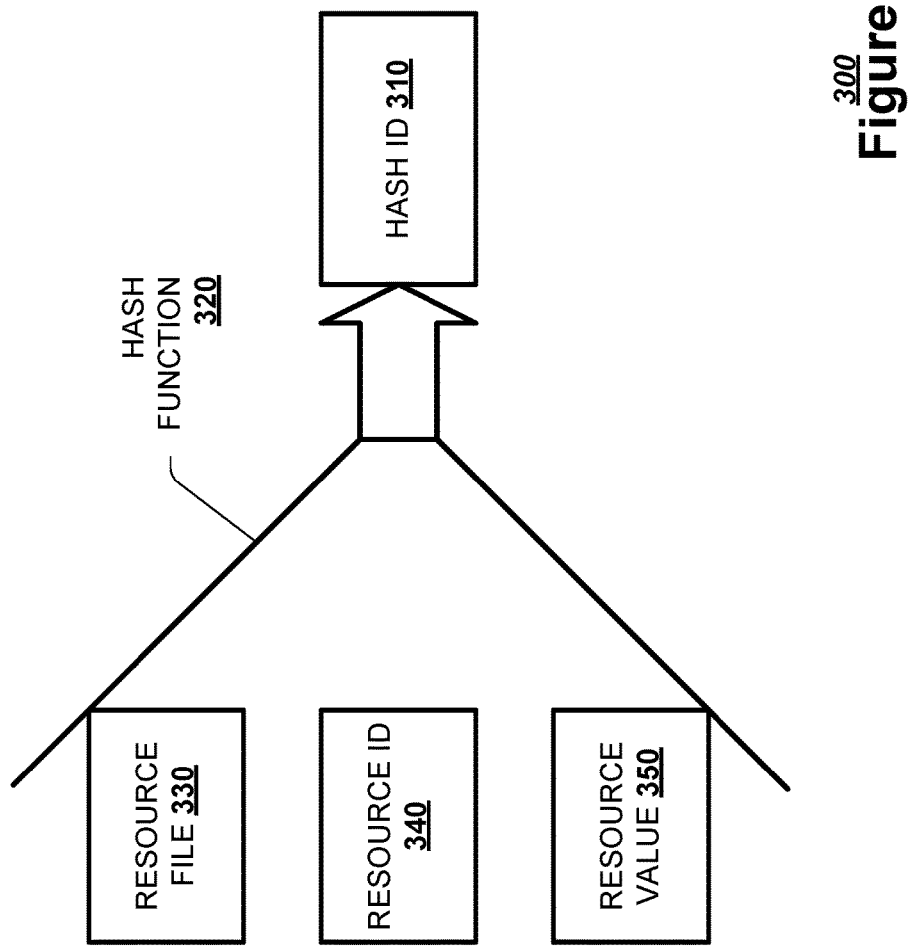
FIG. 3 illustrates, in a block diagram, one embodiment of a hash identifier generation.

FIG. 3 illustrates, in a block diagram, one embodiment of a hash identifier generation 300. Each data string may have a hash identifier 310 to identify that data string. The hash identifier 310 may be generated during run-time by a data string management system 100, a data string test system 150, or a computing device 200 operating a software application. The data string test system 150 may generate a hash identifier based on attributes of the data string resource 110. The data string test system 150 may execute a hash function 320 to generate the hash identifier 310. The data string test system 150 may use a resource file 330, a resource identifier 340, and a resource value 350 as inputs for the hash function 320. A resource file 330 may describe a relative storage path of the data string resource 110. A resource identifier 340 may identify the data string resource 110 within the resource file 330. A resource value 350 may be the value stored at the data string resource 110. The data string test system 150 may adjust the hash function 320 to avoid repetition of hash identifiers 310.

The hash identifier 310 may be stored with the data string and other data string metadata as part of a data string record 400. FIG. 4 illustrates, in a block diagram, one embodiment of a data string record 400. The data string record 400 may be stored in an extensible markup language (XML) format. The data string record 400 may have a hash identifier field 410 to store the hash identifier 310. The data string record 400 may have a string field 420 to store the data string. The data string record 400 may have a translation field 430 to store a translated version of the data string into a local language. Optionally, the data string record 400 may have a language identifier field 440 identifying the local language 440. The data string record 400 may have a confidence score field 450 to store a confidence score indicating the probability that the translation is accurate. The data string record 400 may have a localization flag 460 indicating that the data string has been translated to a local language. The data string record 400 may have a string error history 470 describing any previous errors that have occurred involving the data string. The data string may have caused the errors or just may be involved tangentially. The data string test system 150 may use this information to alert a user to the likelihood of an error being present.

Figure 5:
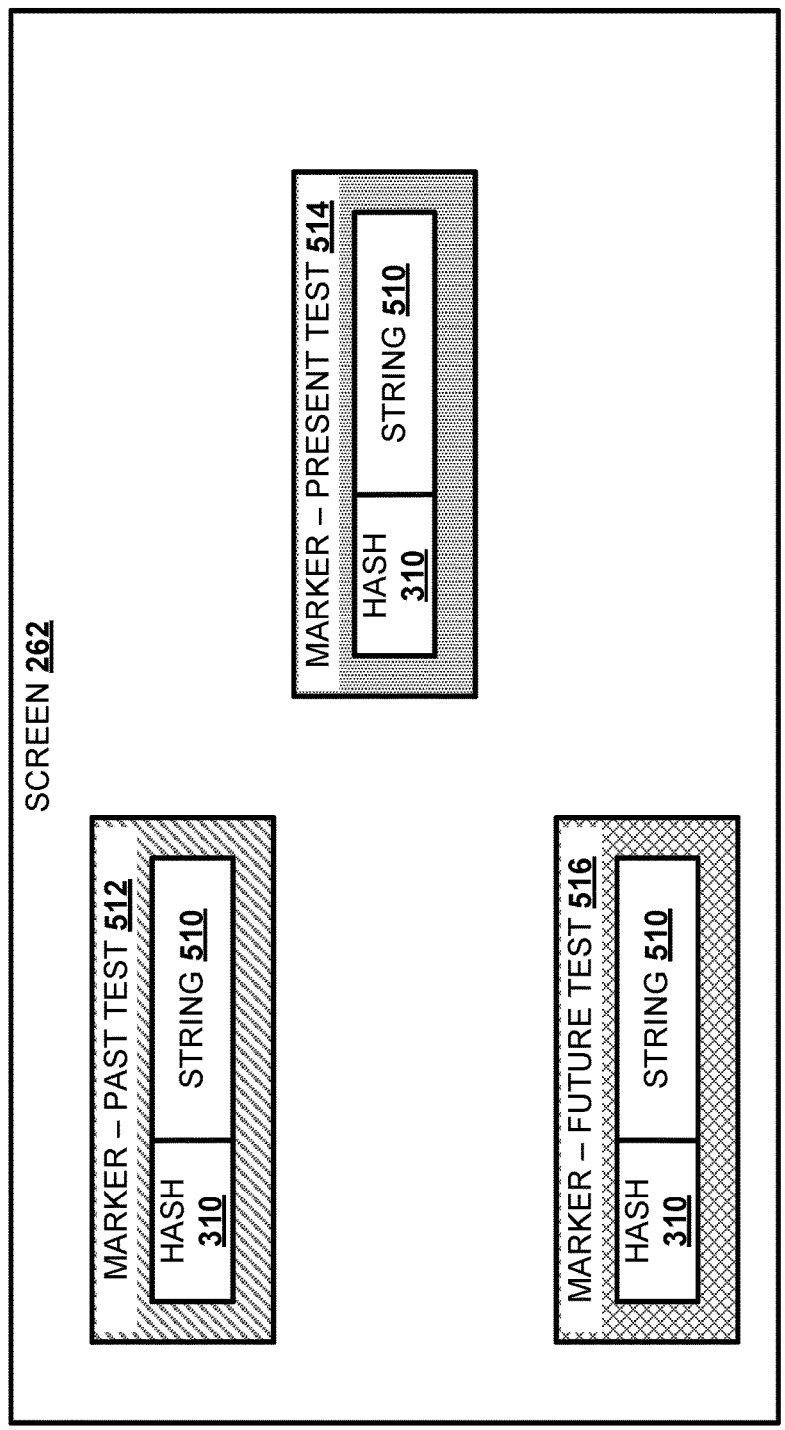
FIG. 5 illustrates, in a block diagram, one embodiment of a data string test user interface.

FIG. 5 illustrates, in a block diagram, one embodiment of a data string test user interface 500. The data string test system 150 may use the data string test user interface 500 to present a set of one or more data strings to a user. The data string test user interface 500 may display the set of one or more data strings 510 to the user on a display screen 262. The user may select one or more data strings 510 from the displayed set of data strings 510 to test. The user may select a data string 510 that has been altered since the last test and has been localized.

The data string test user interface 500 may use a visual marker to identify a data string 510 that is a candidate for testing. A past test visual marker 512 may indicate that the data string 510 is unchanged since the last time the data string 510 was tested. A present test visual marker 514 may indicate that the data string 510 has been altered since the last time the data string 510 was tested and that the data string 510 has been localized since the data string 510 changed. A future test visual marker 516 may indicate that the data string 510 has been altered since the last time the data string 510 was tested but has not been localized.

The visual marker may be a color-coding for the data string 510 that changes the color of the text of the data string 510. For example, the data string test system 150 may color-code a data string 510 that has been changed and localized, and is, thus, ready for testing in green. The data string test system 150 may color-code a data string 510 that has already been tested since the last change to the data string 510 in blue. The data string test system 150 may color-code a data string 510 that has been changed but has not yet been localized in red, indicating that the data string 510 is not yet ready for testing.

Alternately, the visual marker may be a framing polygon that frames the data string 510. The data string test system 150 may frame a data string 510 that has been changed and localized, and is, thus, ready for testing with an arrow. The data string test system 150 may frame a data string 510 that has already been tested since the last change to the data string 510 with a box. The data string test system 150 may frame a data string 510 that has been changed but has not yet been localized with an octagon, indicating that the data string 510 is not yet ready for testing.

Figure 6:
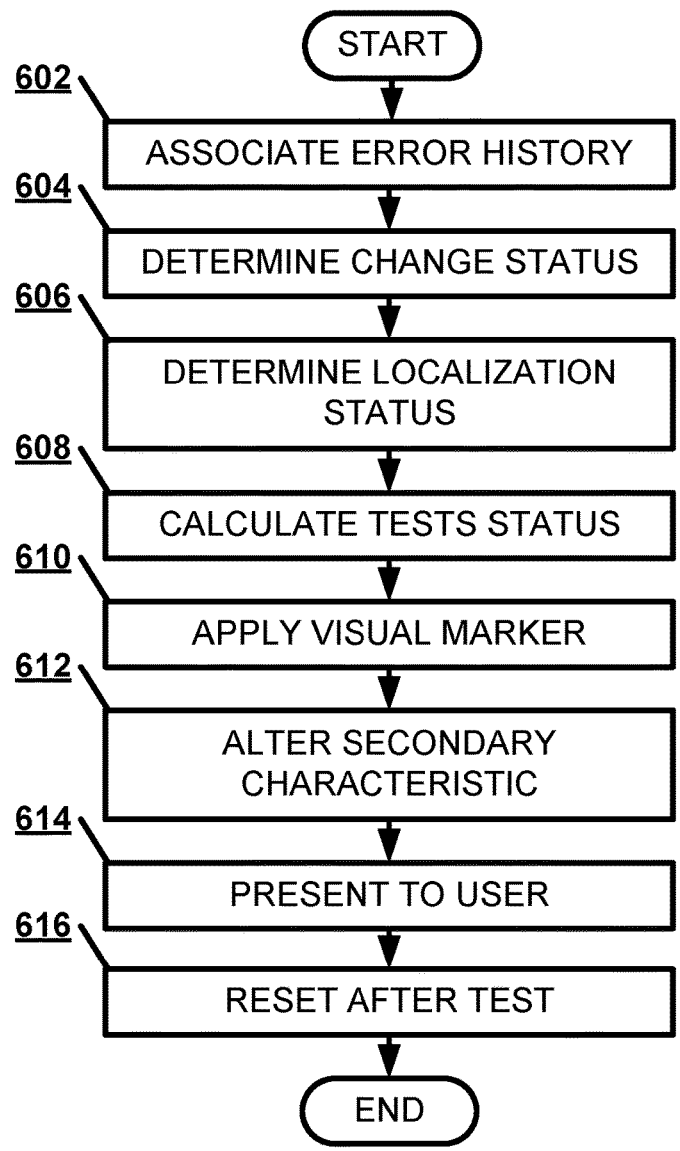
FIG. 6 illustrates, in a flowchart, one embodiment of a method of marking a string for testing.

FIG. 6 illustrates, in a flowchart, one embodiment of a method 600 of marking a string for testing. The data string test system 150 may associate a string error history 470 with the data string 510 (Block 602). The data string test system 150 may determine a change status of the data string 510 (Block 604). The data string test system 150 may determine a localization status of the data string 510 (Block 606). The data string test system 150 may calculate a localization test status of the data string 510 based on the change status and the localization status (Block 608). The data string test system 150 may apply a visual marker of the localization test status to the data string 510 (Block 610). The data string test system 150 may alter a secondary characteristic of the visual marker to indicate at least one of a string error history, a string context, or other data indicating the likelihood that an error is present (Block 612). The data string test system 150 may present the visual marker and the data string 510 to a user (Block 614). The data string test system 150 may reset the visual marker once the data string 510 has been selected for testing (Block 616).

Figure 7:
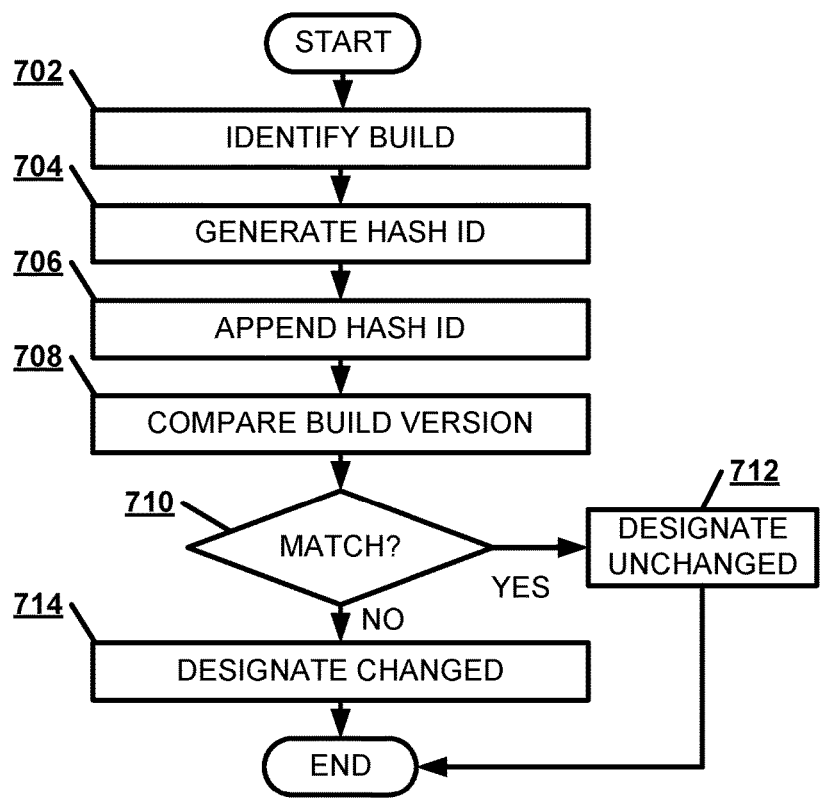
FIG. 7 illustrates, in a flowchart, one embodiment of a method of determining a change status.

FIG. 7 illustrates, in a flowchart, one embodiment of a method 700 of determining a change status. The data string test system 150 may identify that a build has occurred, possibly changing some data strings 510 (Block 702). The data string test system 150 may generate a hash identifier 320 for the data string 510 based on at least one of a resource file 330, a resource identifier 340 for the data string 510, and a resource value 350 for the data string 510 (Block 704). The data string test system 150 may append the hash identifier 320 to the data string 510 (Block 706). The data string test system 150 may compare a current build version of the hash identifier of the data string 510 to a previous build version of the hash identifier 320 (Block 708). If the current build version of the hash identifier 320 matches the previous build version of the hash identifier 320 (Block 710), the data string test system 150 may designate the data string 510 as unchanged (Block 712). If the current build version of the hash identifier 320 does not match the previous build version of the hash identifier 320 (Block 710), the data string test system 150 may designate the data string 510 as having changed (Block 714).

Figure 8:
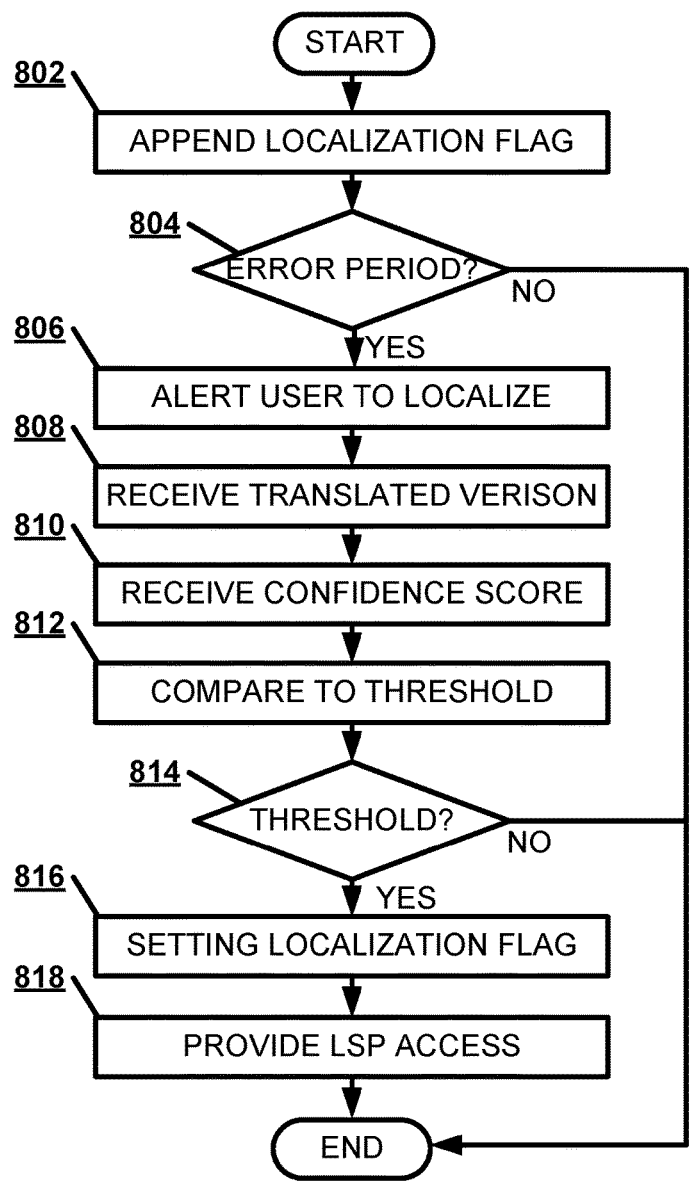
FIG. 8 illustrates, in a flowchart, one embodiment of a method of determining a localization status.

FIG. 8 illustrates, in a flowchart, one embodiment of a method 800 of determining a localization status. The data string test system 150 may append a localization flag to a data string (Block 802). If the data string test system 150 detects that the data string has not been localized for an error period (Block 804), the data string test system 150 may alert a user to analyze a potential lack of localization or a hardcode bug (Block 806). An error period is a minimum amount of time that a data string may go without a localization after a change has occurred as determined by a tester or other administrator. The data string test system 150 may alert the user to localize the data string by altering a characteristic of the visual marker. For example, the data string 510 may be color-coded a flashing red.

The data string test system 150 may receive a translated version 430 of the data string 510 from a translation program 130 (Block 808). The data string test system 150 may receive a confidence score 450 for the translated version of the data string 510 from the translation program 130 (Block 810). The data string test system 150 may compare the confidence score 450 to a confidence threshold (Block 812). If the confidence score 450 passes the confidence threshold (Block 814), the data string test system may set the localization flag 460 when the confidence score 450 for a translated version of the data string 510 passes the confidence threshold (Block 816). The data string test system 150 may provide access to a localization service provider 140 to revise a translated version of the data string 510 (Block 818).

Figure 9:
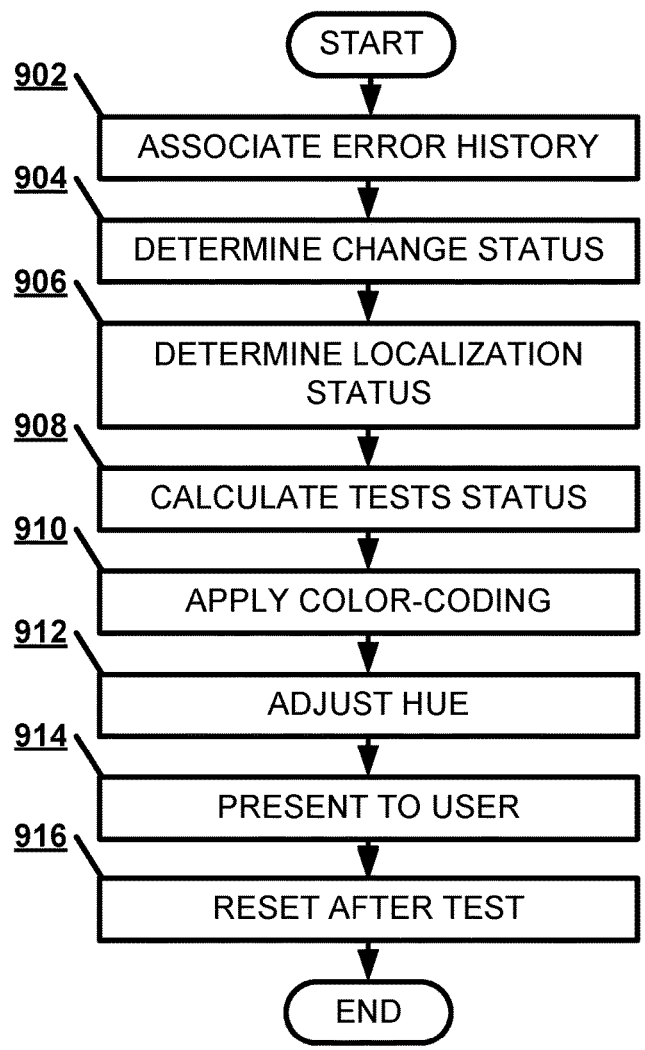
FIG. 9 illustrates, in a flowchart, one embodiment of a method of marking a string for testing using color-coding.

One example of a visual marker the data string test system 150 may use is color-coding. FIG. 9 illustrates, in a flowchart, one embodiment of a method 900 of marking a data string 510 for testing using color-coding. The data string test system 150 may associate a string error history 470 with the data string 510 (Block 902). The data string test system 150 may determine a change status of the data string 510 to calculate the localization test status (Block 904). The data string test system 150 may determine a localization status of the data string 510 to calculate the localization test status (Block 906). The data string test system 150 may calculate a localization test status of the data string 510 based on the change status and the localization status (Block 908). The data string test system 150 may apply a color-coding to the data string 510 as a visual marker indicating a localization test status of the data string 510 (Block 910). The data string test system 150 may adjust a hue of the color-coding to indicate at least one of a string error history, a string context, or other data indicating the likelihood that an error is present (Block 912). The data string test system 150 may present the data string 510 with the color-coding to a user (Block 914). The data string test system 150 may reset the visual marker once the data string 510 has been selected for testing (Block 916).

Figure 10:
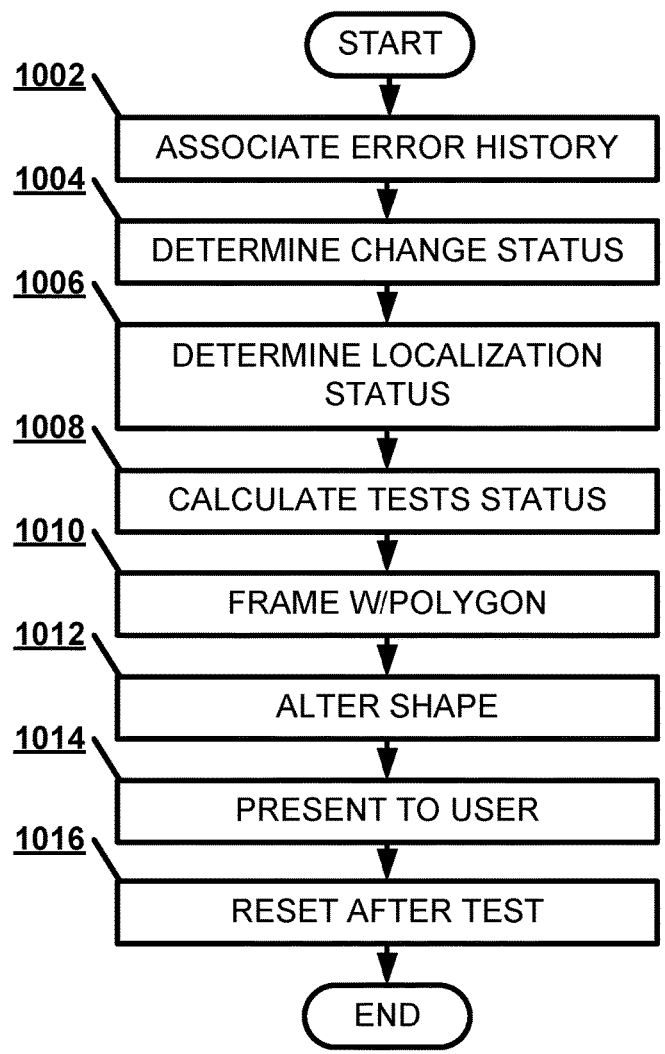
FIG. 10 illustrates, in a flowchart, one embodiment of a method of marking a string for testing using polygons.

One example of a visual marker the data string test system 150 may use is a polygon framing. FIG. 10 illustrates, in a flowchart, one embodiment of a method 1000 of marking a data string 510 for testing using polygons. The data string test system 150 may associate a string error history 470 with the data string 510 (Block 1002). The data string test system 150 may determine a change status of the data string 510 (Block 1004). The data string test system 150 may determine a localization status of the data string 510 (Block 1006). The data string test system 150 may calculate a localization test status of the data string 510 based on the change status and the localization status (Block 1008). The data string test system 150 may frame the data string 510 with a framing polygon as a visual marker indicating a localization test status of the data string 510 (Block 1010). The data string test system 150 may alter the shape of the framing polygon to indicate at least one of a string error history, a string context, or other data indicating the likelihood that an error is present (Block 1012). The data string test system 150 may present the data string 510 with the framing polygon to a user (Block 1014). The data string test system 150 may reset the visual marker once the data string 510 has been selected for testing (Block 1016).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

I claim:

1. A computing device, comprising:
   at least one processor; and
   at least one memory storing computer executable instructions that when executed by the at least one processor cause the computing device to:
   determine that at least a subset of a plurality of data strings has changed;
   calculate a localization test status for at least the subset of data strings, comprising:
   calculate a first localization test status indicating that a first data string has been translated into a local language and is ready to be localization tested for translation quality; and
   calculate a second localization test status indicating that a second data string has been translated into a local language and has been localization tested for translation quality;
   provide a visual marker overlaid atop each data string of at least the subset of data strings indicating the localization test status, wherein a first visual marker indicates the first localization test status and a second visual marker indicates the second localization test status, wherein the first visual marker is different from the second visual marker to enable a user to visually distinguish between at least the first data string having the first localization test status and the second data string having the second localization test status; and
   change a secondary characteristic of at least one of the first visual marker or the second visual marker when a string error history describing previous errors that have occurred involving one of the first data string or the second data string indicates that an error is present in one of the first data string or the second data string.

2. The computing device of claim 1, the computer executable instructions further causing the computing device to:
   calculate a third localization test status indicating that a third data string has not been translated into a local language and is not ready to be localization tested for translation quality; and
   provide a third visual marker overlaid atop the third data string of at least the subset of data strings that indicates the third localization test status, wherein the third visual marker is different from the first visual marker and the second visual marker.

3. The computing device of claim 1, wherein the first visual marker and the second visual marker enable a user to visually distinguish between the localization test statuses for at least the subset of data strings so as to identify one or more data strings of the plurality of data strings that are ready for localization testing.

4. The computing device of claim 1, the computer executable instructions further causing the computing device to:
apply a color-coding to the first data string as the first visual marker.

5. The computing device of claim 1, the computer executable instructions further causing the computing device to:
frame the first data string with a framing polygon as the first visual marker.

6. The computing device of claim 1, the computer executable instructions further causing the computing device to:
associate a string error history with the first data string.

7. The computing device of claim 1, wherein changing the secondary characteristic of one of the first visual marker or the second visual marker comprises changing a hue of a color-coding associated with one of the first visual marker or the second visual marker to indicate that an error is present.

8. The computing device of claim 1, the computer executable instructions further causing the computing device to:
append a hash identifier to the first data string.

9. The computing device of claim 1, the computer executable instructions further causing the computing device to:
generate a hash identifier for the first data string based on at least one of a resource file, a resource identifier for the first data string, or a resource value for the first data string.

10. The computing device of claim 1, the computer executable instructions further causing the computing device to:
compare a current build version of a hash identifier of the first data string to a previous build version of the hash identifier.

11. The computing device of claim 1, the computer executable instructions further causing the computing device to:
append a localization flag to the first data string.

12. The computing device of claim 1, the computer executable instructions further causing the computing device to:
receive a confidence score for a translated version of the first data string from a translation program.

13. The computing device of claim 12, the computer executable instructions further causing the computing device to:
set a localization flag when the confidence score for a translated version of the first data string passes a confidence threshold.

14. The computing device of claim 1, the computer executable instructions further causing the computing device to:
provide access to a localization service provider to revise a translated version of the first data string.

15. The computing device of claim 1, the computer executable instructions further causing the computing device to:
detect that the first data string has not be been localized for an error period.

16. A method executed by a computer system to identify one or more data strings for localization testing, comprising:
determining that at least a subset of a plurality of data strings has changed;
calculating a localization test status for at least the subset of data strings, comprising:
calculating a first localization test status indicating that a first data string has been translated into a local language and is ready to be localization tested for translation quality; and
calculating a second localization test status indicating that a second data string has been translated into a local language and has been localization tested for translation quality;
providing a visual marker overlaid atop each data string of at least the subset of data strings indicating the localization test status, wherein a first visual marker indicates the first localization test status and a second visual marker indicates the second localization test status, wherein the first visual marker is different from the second visual marker to enable a user to visually distinguish between at least the first data string having the first localization test status and the second data string having the second localization test status; and
changing a secondary characteristic of one of the first visual marker or the second visual marker when a string error history describing previous errors that have occurred involving one of the first data string or the second data string indicates that an error is present in one of the first data string or the second data string.

17. The method of claim 16, wherein the first visual marker and the second visual marker enable a user to visually distinguish between the localization test statuses for at least the subset of data strings so as to identify one or more data strings of the plurality of data strings that are ready for localization testing.

18. The method of claim 16, further comprising:
applying a color-coding to the first data string as the first visual marker.

19. A computer-readable medium storing computer executable instructions that when executed by a processor perform a method, the method comprising:
determining that at least a subset of a plurality of data strings has changed;
calculating a localization test status for at least the subset of data strings, comprising:
calculating a first localization test status indicating that a first data string has been translated into a local language and is ready to be localization tested for translation quality; and
calculating a second localization test status indicating that a second data string has been translated into a local language and has been localization tested for translation quality;
providing a visual marker overlaid atop each data string of at least the subset of data strings indicating the localization test status, wherein a first visual marker indicates the first localization test status and a second visual marker indicates the second localization test status, wherein the first visual marker is different from the second visual marker to enable a user to visually distinguish between at least the first data string having the first localization test status and the second data string having the second localization test status; and
changing a hue of a color-coding of at least one of the first visual marker or the second visual marker when a string error history describing previous errors that have occurred involving one of the first data string or the second data string indicates that an error is present in one of the first data string or the second data string.

20. The computer-readable medium of claim 19, wherein the first visual marker and the second visual marker enable a user to visually distinguish between the localization test statuses for at least the subset of data strings so as to identify one or more data strings of the plurality of data strings that are ready for localization testing.

* * * * *